(12) United States Patent
Fleckenstein

(10) Patent No.: US 8,757,404 B1
(45) Date of Patent: Jun. 24, 2014

(54) COMBINATION BEVERAGE CONTAINER AND GOLF BALL WARMER

(76) Inventor: William Fleckenstein, Centre Hall, PA (US)

( * ) Notice: Subject to any disclaimer, the term of this patent is extended or adjusted under 35 U.S.C. 154(b) by 322 days.

(21) Appl. No.: 13/007,415

(22) Filed: Jan. 14, 2011

(51) Int. Cl.
*B65D 1/04* (2006.01)
*B65D 77/08* (2006.01)
*A47J 39/00* (2006.01)

(52) U.S. Cl.
USPC .......................... 215/6; 206/217; 220/592.16

(58) Field of Classification Search
CPC ........... A47G 19/2227; A47G 19/2255; F25D 2303/0845
USPC ............... 220/592.16, 592.17, 592.2, 592.21, 220/592.23–592.28, 625, 702, 735, 915.1, 220/915.2; 206/217, 547; 215/6; D03/257
See application file for complete search history.

(56) References Cited

U.S. PATENT DOCUMENTS

| | | | |
|---|---|---|---|
| 2,017,426 A * | 10/1935 | Willeke | 222/130 |
| 4,134,492 A | 1/1979 | Lucas | |
| 4,194,647 A * | 3/1980 | Spurrier | 221/97 |
| 4,324,338 A * | 4/1982 | Beall | 215/6 |
| 4,420,681 A | 12/1983 | Arnold | |
| 4,450,667 A | 5/1984 | Fitzpatrick | |
| 4,545,362 A | 10/1985 | Hendricks | |
| 4,795,028 A * | 1/1989 | Wittig et al. | 206/217 |
| 5,057,670 A | 10/1991 | Cohen | |
| 6,244,434 B1 | 6/2001 | Brooks | |
| 6,409,038 B1 | 6/2002 | Karp | |
| 6,862,896 B1 * | 3/2005 | Seidl | 62/457.4 |
| 7,845,489 B2 * | 12/2010 | Thompson | 206/217 |
| 8,033,407 B2 * | 10/2011 | Minca | 215/13.1 |
| 8,132,687 B2 * | 3/2012 | Fedusa et al. | 220/62.18 |
| 2004/0056037 A1 | 3/2004 | Gluck | |
| 2006/0086755 A1 * | 4/2006 | Roth et al. | 222/129 |
| 2008/0223739 A1 | 9/2008 | Thompson | |
| 2010/0189847 A1 * | 7/2010 | Roth et al. | 426/109 |
| 2010/0282762 A1 * | 11/2010 | Leonard | 220/592.01 |

* cited by examiner

*Primary Examiner* — Bryon Gehman
*Assistant Examiner* — Shawn M Braden

(57) ABSTRACT

A container having two compartments separated by a thermally conductive partition is described. One of the compartments is used for storing a hot beverage and the other compartment is used for storing other items like golf balls that need to be warmed. The heat of the hot beverage can be transferred through the thermally conductive partition to warm other items like golf balls. The same apparatus can also use the coldness of a cold beverage to cool other items like snacks, etc. The upper compartment has a thermally insulated peripheral wall and a thermally insulated lid. The lower compartment has a thermally insulated peripheral wall and a thermally insulated bottom wall. There is a shared thermally conductive wall shared between the upper and lower compartments. The lid in the upper compartment may be opened for adding a hot or cold beverage. The lower compartment has a selectively closable opening that can be used to insert items like golf balls that need to be warmed or items like snacks that need to be cooled.

6 Claims, 3 Drawing Sheets

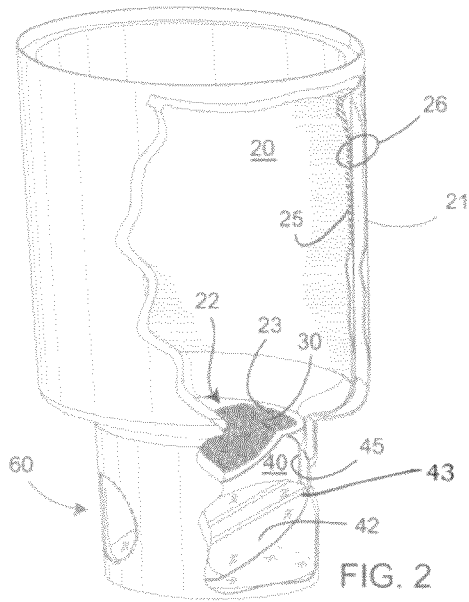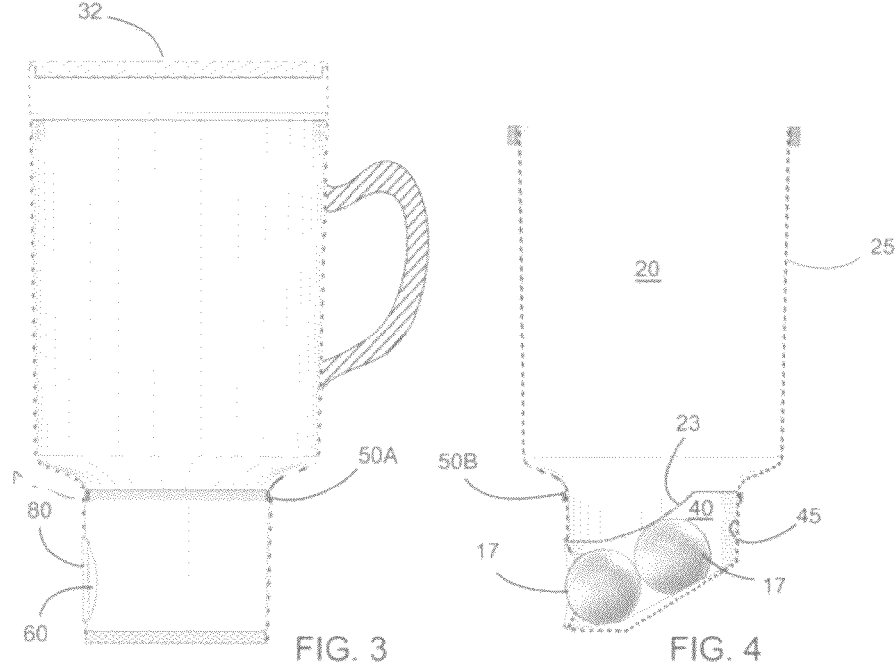

COMBINATION BEVERAGE CONTAINER AND GOLF BALL WARMER

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to the field of thermally insulated flasks, mugs, and other beverage containers, and more particularly to the field of thermally insulated beverage containers having a beverage in one compartment and other items in another compartment.

DISCUSSION OF RELATED ART

Thermally insulated flasks, mugs, and other containers are used extensively for carrying hot and cold beverages. While beverage containers partitioned into multiple compartments are known, utilizing the heat of a hot beverage to heat other items is not known in the art. Similarly, the coldness of a cold beverage is not known to be used to cool other items.

It will be desirable to use the heat of a hot beverage stored in a thermally insulated flask, mug, or other beverage container to heat other items, such as golf balls. Similarly, it will be desirable to use the coldness of a cold beverage stored in a thermally insulated flask, mug, or other beverage container to cool other items, such a chocolates.

The present invention accomplishes these objectives.

SUMMARY OF THE INVENTION

The problem of using the heat of a hot beverage stored in a thermally insulated flask, mug, or other beverage container to warm other items like golf balls is solved by partitioning the container into a compartment for storing the hot beverage and another compartment for storing other items like golf balls, etc., the two compartments separated by a thermally conductive partition allowing heat transfer between the two compartments. The same apparatus can also use the coldness of a cold beverage to cool other items like snacks, etc.

In an embodiment of the invention, a container can have an upper compartment for storing a hot or cold beverage and a lower compartment for storing other items, the two compartments separated by a shared wall. The upper compartment has a thermally insulated peripheral wall, a thermally insulated lid, and the shared wall between the upper and lower compartments. The lower compartment has a thermally insulated peripheral wall, a thermally insulated base, and the shared wall. A portion of the shared wall has a thermally conductive section.

The thermally conductive section shared by the upper and lower compartments enables heat transfer between the two compartments. The insulated peripheral walls of the upper and lower compartments, the thermally insulated lid, and the thermally insulated base of the lower compartment minimize heat transfer with the ambient atmosphere.

The lid in the upper compartment may be opened for adding a hot or cold beverage. The lower compartment has a selectively closable opening that can be used to insert items like golf balls on tracks that need to be warmed or items like chocolates that need to be cooled, for example. It is said that relatively warm golf balls will travel further than ambient temperature or cooler golf balls.

Other features and advantages of the present invention will become apparent from the following more detailed description, taken in conjunction with the accompanying drawings, which illustrate, by way of example, the principles of the invention.

DESCRIPTION OF THE DRAWINGS

FIG. 2 is a cut-out view of an exemplary container having an upper compartment for storing a beverage and a lower compartment for storing other items;

FIG. 3 is an elevation view of an exemplary container showing the attachment of an upper compartment with a lower compartment with cooperative screw threads;

FIG. 4 is an elevation view of an exemplary container showing a cut-out view of the lower compartment having golf balls;

DETAILED DESCRIPTION OF THE PREFERRED EMBODIMENTS

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. The term "heated" for simplicity is used in this disclosure for the concept of heat transfer, and therefore could also mean "cooling" in a different context, for example, when a cold beverage is used to cool a snack, for example, a chocolate.

The problem of using the heat of a hot beverage stored in a thermally insulated flask, mug or other container to warm other items like golf balls is solved by partitioning the flask, jug or other container into a compartment for storing the hot beverage and another compartment for storing on tracks other items like golf balls, etc., the two compartments sharing a thermally conductive section allowing heat transfer between the two compartments.

Similarly, the problem of using the coldness of a cold beverage stored in a thermally insulated flask, mug, or other container to cool other items like chocolates is solved by partitioning the flask, mug, or other container into a compartment for storing the cold beverage and another compartment for storing other items like chocolates, etc., the two compartments sharing a thermally conductive section allowing heat transfer between the two compartments.

Figure 1:
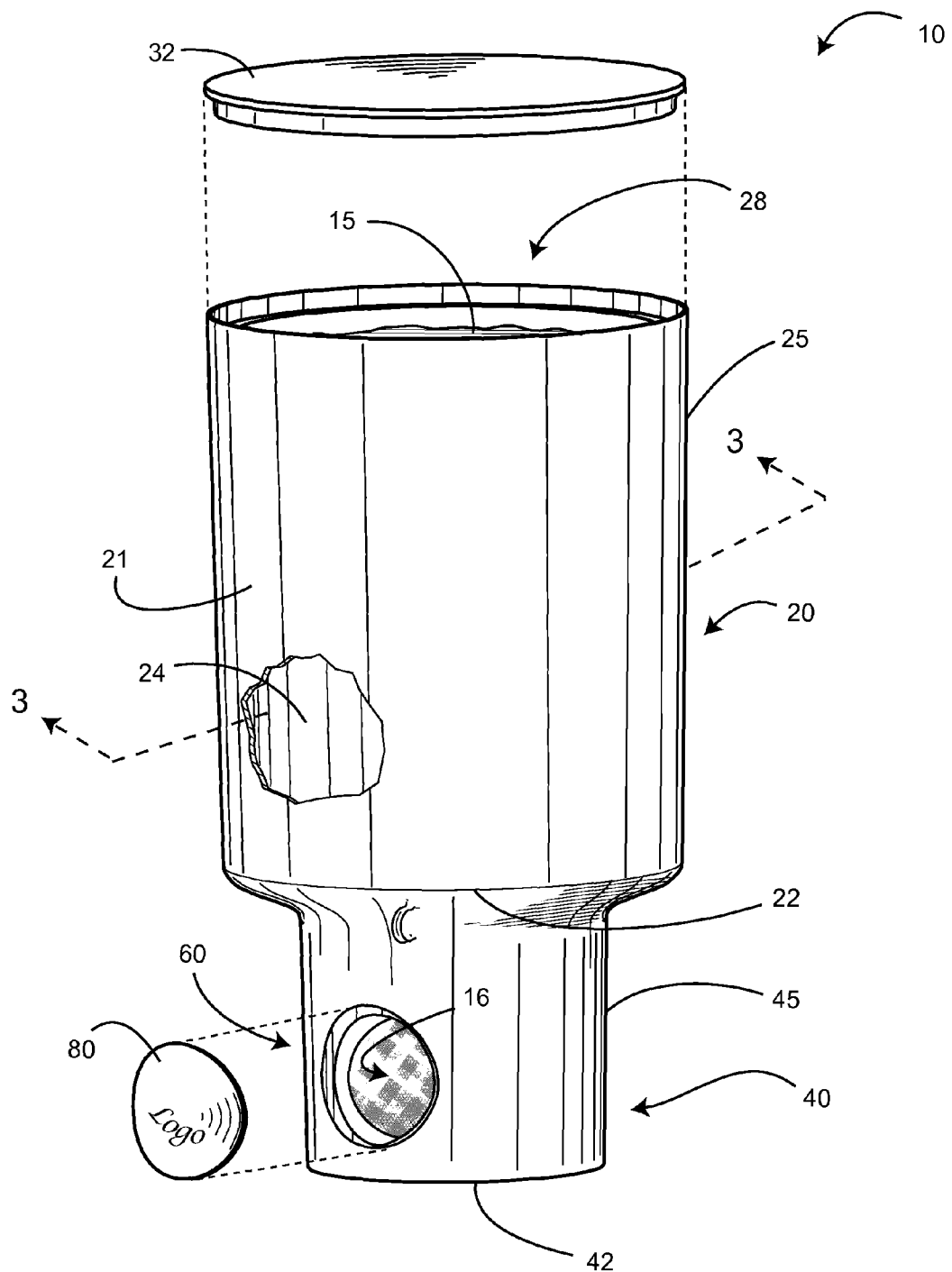
FIG. 1 is perspective view of an exemplary container having an upper compartment for storing a beverage and a lower compartment for storing other items.

FIG. 1 and FIG. 2 show embodiments of a container 10 having an upper compartment 20 for storing a hot or cold beverage 15 and a lower compartment 40 for storing other items, the two compartments separated by a shared partition wall 22. The container 10 may be a flask, mug, or any other type of container. The upper compartment 20 has a thermally insulated peripheral wall 25, a thermally insulated lid 32, and the shared partition wall 22 separating the upper compartment 20 and the lower compartment 40. The lower compartment 40 has a thermally insulated peripheral wall 45, a thermally insulated base 42, and the shared partition wall 22. A portion 23 of the shared partition wall 22 has a thermally conductive section 30 to permit heat transfer between the upper compartment 20 and the lower compartment 40. The insulated peripheral walls 25 and 45 of the upper and lower compartments 20 and 40 respectively, the thermally insulated lid 32, and the thermally insulated base 42 of the lower compartment 40 minimize heat transfer with the ambient atmosphere. The tracks 43 raise the contents from the base 42.

The thermally conductive section 30 may be constructed from any of the common thermally conductive materials like metals, metal alloys, or even specially formulated plastics. Stainless steel is a preferred material, but other materials like copper, brass, bronze, etc. may also be used. Persons skilled in the art know of thermally conductive plastics that can be formulated to conduct heat up to 600° F. with thermal conductivity of 20+ W/mK, which exceeds that of stainless steel. Thermally conductive plastics may be formulated, for example, from polyamides and other engineering plastics and may incorporate ceramic, carbon fiber, or other additives.

In some embodiments, the peripheral walls 25 and 45 may be made from any insulating material like plastic or foam. In some other embodiments, the peripheral walls 25 and 45 may be double-walled with vacuum between the inner and outer wall, as in a vacuum flask. Using vacuum as an insulator avoids heat transfer by conduction or convection. Radiant heat loss can be minimized by applying a reflective coating to surfaces.

The lid 32 in the upper compartment 20 is also insulating and may be opened for adding a hot or cold beverage 15 to the upper compartment 20. The upper compartment 20 has a peripheral wall 25 that may have an outer shell 21 and an inner shell 24. The lower compartment 40 has peripheral wall 45, a base 42, and a selectively closable opening 60 that can be used to insert other items 16 that need to be warmed (for example, golf balls) or cooled (for example, chocolates, fruit, or other snacks). Clearly any suitably-sized item can be stored in the lower compartment 40, such as keys or coins, provided such items are not subject to damage by being heated or cooled, as the case may be. The selectively closable opening 60 may be sealed with a friction-fit cap 80.

In an embodiment shown in FIG. 3, the lower compartment 40 may be detachable from the upper compartment 20. The lower compartment 40 and the upper compartment 20 may be detachably joined together by cooperative screw threads 50A, 50B. In other embodiments, the lower compartment 40 and the upper compartment 20 may be permanently joined together as shown in the embodiments shown in FIG. 1 and FIG. 2.

In an embodiment shown in FIG. 4, the lower compartment 40 may store golf balls 17 that can be warmed using the heat of a hot beverage stored in the upper compartment 20. In a similar embodiment (not shown), the thermally conductive section 30 of the shared partition wall 22, or, alternately, the entire shared partition wall 22, may be cylindrical and adapted to substantially surround and contain the golf balls 17. In yet another embodiment (not shown), the lower compartment 40 takes the form of an inverted test tube projecting up through the center of the upper compartment 20, the selectively closable opening 60 of such an embodiment being open at the base 42 opposite the open top end 28 of the upper compartment 20, that is, on the bottom of the container 10. The peripheral wall 45 of such a lower compartment 40 is entirely comprised of the thermal transfer section 30 that is more thermally conductive than the peripheral wall 25 of the upper compartment 20.

Figure 5:
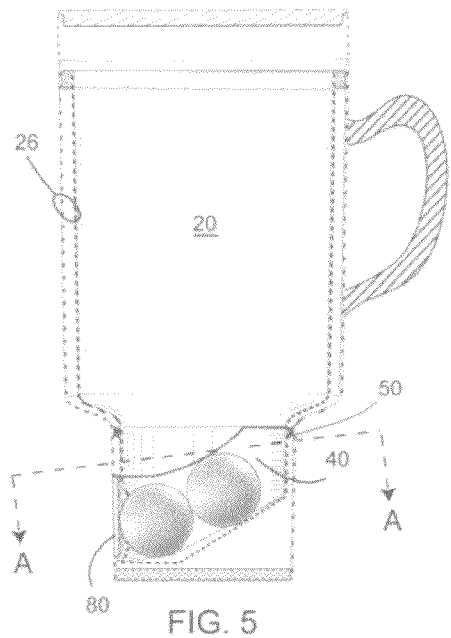
FIG. 5 shows a cut-out view of the lower compartment of an exemplary container whose peripheral walls have a double wall with vacuum between the inner and outer walls.

In an embodiment shown in FIG. 5, the peripheral wall 25 comprises a double wall 26 that may have a vacuum between the inner and outer walls.

Figure 7:
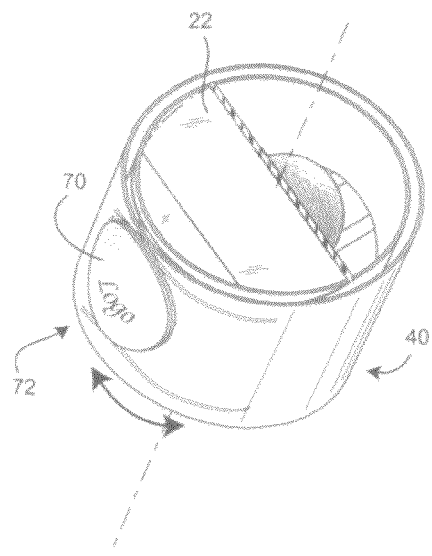
FIG. 6 and FIG. 7 show open and closed positions respectively of an exemplary sliding door over an opening in a lower compartment.
Figure 6:
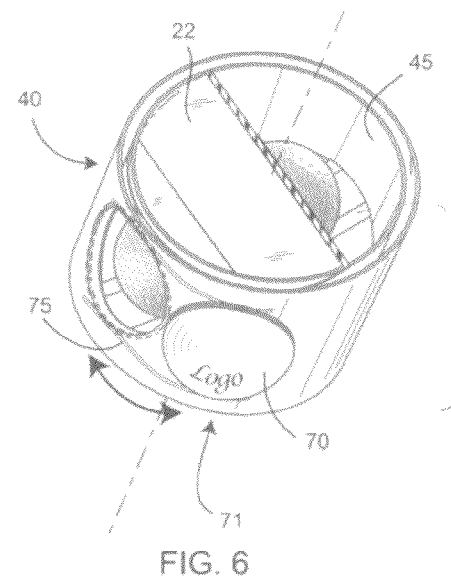
Figure 8:
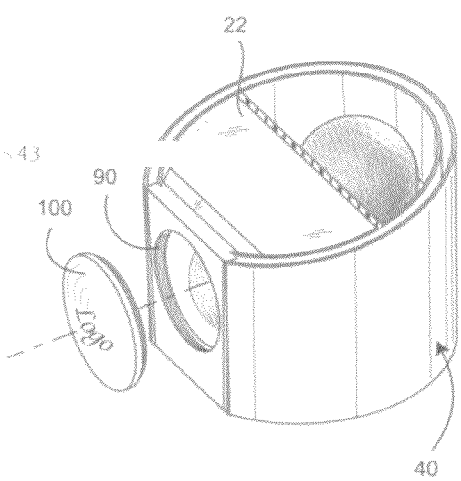
FIG. 8 shows a lower compartment having an exemplary selectively closable opening having screwed threads that may be sealed by a threaded cap.

In an embodiment shown in FIG. 6 and FIG. 7, FIG. 6 The tracks 43 raise the contents from the base 42.

In an embodiment as shown in FIG. 1, the selectively closable opening 60 in the lower compartment 40 may be sealed by inserting a friction-fit cap 80 and opened by removing the cap from the opening.

In an embodiment, the lower compartment 40 is of a smaller diameter than the upper compartment 20.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in be applied to other systems, not necessarily the system described above. The elements and acts of the various embodiments described above can be combined to provide further embodiments.

All the patents, applications and other references listed in the accompanying filing papers are incorporated herein by reference. Aspects of the invention can be modified, if necessary, to employ the systems, functions, and concepts of the various references to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A container for holding a beverage and other items to be heated, comprising:
    an upper compartment having an open top end for receiving the beverage therein and including a peripheral wall and a lower wall, at least a portion of the lower wall including a thermal transfer section that is more thermally conductive than the peripheral wall of the upper compartment; and
    a lower compartment selectively fixed with the lower wall of the upper compartment and having a peripheral wall and a base that are both less thermally conductive than the thermal transfer section;
    whereby with the lower compartment detached from the upper compartment, the items to be heated may be placed into the lower compartment on tracks and the lower compartment fixed with the upper compartment, such that a heated beverage retained in the upper compartment transfers heat through the thermal transfer section to the items in the lower compartment, said tracks are raised areas of the base of the lower compartment.

2. The container of claim 1 wherein the lower compartment is adapted to receive a plurality of golf balls on said tracks therein.

3. A container for holding a beverage and a plurality of items to be heated, comprising:
    an upper compartment having an open top end for receiving the beverage therein and including a peripheral wall and a lower wall, at least a portion of the lower wall including a thermal transfer section that is more thermally conductive than the peripheral wall of the upper container; and
    a lower compartment fixed with the lower wall of the upper compartment and having a peripheral wall and a base that are both less thermally conductive than the thermal transfer section, the lower compartment further including a selectively closable opening through the peripheral wall of the lower compartment;
    whereby the items to be heated are placed on tracks in the lower compartment through the opening therein and the opening closed, such that a heated beverage retained in the upper container transfers heat through the thermal transfer section to the items in the lower compartment, said tracks are raised areas of the base of the lower compartment.

4. The container of claim 3 wherein the selectively closable opening includes a friction-fit cap that may be inserted in the opening to seal the opening and removed from the opening to open the opening.

5. The container of claim 3 wherein the lower compartment fits a standard cup holder.

6. The container of claim 3 wherein the lower compartment is adapted to receive golf balls on said tracks through the selectively closable opening in the peripheral wall.

\* \* \* \* \*